Aug. 28, 1923.
L. P. KYRIDES
1,466,535
MANUFACTURE OF TRIARYL GUANIDINES
Filed June 15, 1922
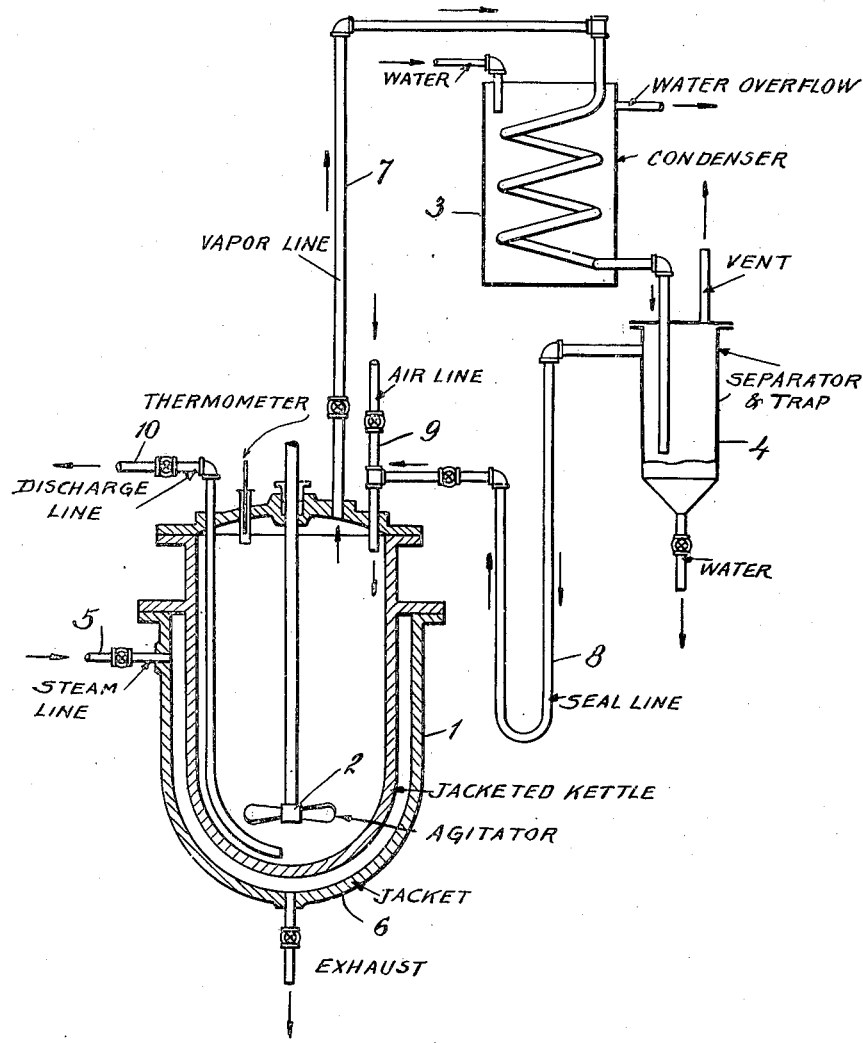
INVENTOR
Lucas P. Kyrides
BY
Pennie, Davis, Marvin & Edmonds
ATTORNEYS Patented Aug. 28, 1923.

1,466,535

UNITED STATES PATENT OFFICE.

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK.

MANUFACTURE OF TRIARYL GUANIDINES.

Application filed June 15, 1922. Serial No. 568,630.

*To all whom it may concern:*

Be it known that I, LUCAS P. KYRIDES (whose name was changed by judicial decree from LUCAS P. KYRIAKIDES), a citizen of the United States, residing at Buffalo, in the county of Erie, State of New York, have invented certain new and useful Improvements in the Manufacture of Triaryl Guanidines; and I do hereby declare the following to be a full, clear, and exact description of the invention, such as will enable others skilled in the art to which it appertains to make and use the same.

This invention relates to improvements in the manufacture of triarylguanidines, such as triphenylguanidine, etc.

According to the present invention the triarylguanidines are produced by treating with a desulfurizing agent, for example, lead oxide, etc., a solution of diarylthiourea and an arylamine in an inert hydrocarbon solvent immiscible with water. For example, triphenylguanidine can be obtained in good yield and of excellent purity by treating a hot toluene solution of aniline and thiocarbanilide with finely divided litharge. The use of such an inert solvent permits an economic recovery of said solvent at a relatively low cost and enables the reaction to be carried out with removal of water as the reaction proceeds.

The process is advantageously carried out by gradually adding the desulfurizing agent, for example, lead oxide to the boiling hydrocarbon solution, and with the use of a reflux condenser so arranged that the water present or formed during the reaction is separated and removed from the condensed solvent before its return from the condenser to the reaction vessel.

The invention will be further described by the following specific example in connection with the accompanying drawing which illustrates an elevation partly in section of one form of apparatus adapted to carrying out the process, but it will be understood that the invention is not limited thereto.

In a jacketed kettle 1, equipped with an agitator 2 and a reflux condenser 3, with a separator and a trap 4 arranged between the reflux condenser 3 and the kettle 1, there are dissolved with agitation 164 lbs. of aniline and 400 lbs. of thiocarbanilide (or diphenylthiourea) in 1200 lbs. of toluene, and the contents of the kettle are then heated by means of steam supplied by pipe 5 to the jacket 6 of the kettle until the temperature of the vapor in the kettle 1 reaches 100° C. The vapors from the kettle 1 pass through the vapor line 7 to the condenser 3 where they are condensed, and the condensate is passed through the separator and trap 4 where, if water is present, a part or all of the water separates out as a lower layer while the toluene rises to the top or upper layer from whence it is returned through the seal line 8 to the kettle 1. The lower layer of water in the separator and trap 4 is drawn off from time to time. As soon as the temperature of the vapor has reached 100° C., there is gradually added about 420 lbs. of finely comminuted litharge, the solution being well agitated during the addition, and the rate of addition being such that about 1½ to 2 hrs. are required. During the addition of the litharge steam is admitted to the jacket of the kettle, only to such an extent as may be necessary to keep the solution at the boiling temperature and maintain a good reflux. After the litharge has all been added, the contents of the kettle, with continued agitation, are further heated with refluxing of the toluene until the temperature of the vapor in the kettle reaches 110° C. and the refluxing is continued thereafter until the reaction is complete, which usually requires about 2 hrs.

When the reaction is completed, the mixture is filtered hot to separate the solution of triphenylguanidine from the lead sulphide residue, and the residue is washed with hot toluene. The triphenylguanidine can be recovered from the hot toluene solution by cooling and crystallization, and the remaining mother liquid can be utilized in the further carrying on of the process. The triphenylguanidine, however, is produced in a sufficiently pure state, in the manner above described, so that the hot toluene solution can be subjected to distillation to remove the toluene, leaving the triphenylguanidine as the residue which can then be dried in a current of air at a temperature of 90 to 95° C. and then ground to a fine powder.

Instead of using toluene as the inert hydrocarbon solvent, immiscible with water, other suitable hydrocarbon solvents can be similarly used, for example, benzene, xylene, solvent naphtha, etc.; but toluene is particularly advantageous. It boils at about 110°

C. which appears to be the best temperature for the reaction. The water is distilled off with the toluene and can be separated from the condensed toluene before the condensate is returned to the kettle. If the toluene contains water, it is thus dehydrated during the reaction, while the water of reaction is also continually removed. When the toluene is finally recovered by distillation from the triphenylguanidine, it is already in an anhydrous condition and ready for immediate use in the further carrying on of the process. The boiling toluene is an excellent solvent for the thiocarbanilide and aniline as well as for triphenylguanidine; while cold toluene has a greatly reduced solvent capacity for triphenylguanidine such that the greater part of the triphenylguanidine can be directly recovered by cooling and cyrstallization, and thereby obtained in a very pure state while the mother liquor can then be used as a solvent in the further carrying on of the process.

When water is present in the toluene at the beginning of the reaction, the boiling point is below that of toluene itself, so that the temperature increases gradually up to about 110° C. At this latter temperature the speed of reaction is very greatly increased, so that the reaction time is correspondingly reduced.

Other triarylguanidines besides triphenylguanidine can be produced in a similar manner. Thus, instead of using anilin, other arylamines can be similarly used, for example, toluidines, xylidines, etc. Similarly instead of using thiocarbanilid or diphenylthiourea, other diarylthioureas can be used, for example, ditolylthiourea, phenyltolylthiourea, or other simple or mixed diarylthioureas. The triarylguanidine accordingly may have all three of the aryl groups the same, or two groups may be different from the third, or all three may be different from each other. For example, using thiocarbanilide and orthotoluidine, a mixed tolyldiphenylguanidine is produced.

Instead of using litharge as the desulfurizing agent, other agents can be used, for example, lead hydroxide, etc., although the use of litharge is particularly advantageous.

I claim:

1. The method of producing triarylguanidines which comprises heating a solution of an arylamine and a diarylthiourea with an inert hydrocarbon solvent immiscible with water in the presence of a desulfurizing agent and simultaneously removing by distillation the water formed in the reaction.

2. The method of producing triphenylguanidine which comprises heating a solution of aniline and thiocarbanilide in an inert hydrocarbon solvent immiscible with water in the presence of a desulfurizing agent and simultaneously removing by distillation the water formed in the reaction.

3. The method of producing triarylguanidines which comprises heating a solution of arylamine and diarylthiourea in an inert hydrocarbon solvent having a boiling point higher than that of water and immiscible with water, to a temperature above the boiling point of water, in the presence of a desulfurizing agent.

4. The method of producing triphenylguanidines which comprises heating a solution of aniline and thiocarbanilide in an inert hydrocarbon solvent having a boiling point higher than that of water and immiscible with water, to a temperature above the boiling point of water, in the presence of a desulfurizing agent.

5. The method of producing triarylguanidines which comprises heating a solution of arylamine and diarylthiourea with toluene, to a temperature above the boiling point of water, with a desulfurizing agent.

6. The method of producing a triphenylguanidines which comprises heating a solution of aniline and thiocarbanilide in toluene, to a temperature above the boiling point of water, with a desulfurizing agent.

7. The method of producing triarylguanidines which comprises heating a solution of an arylamine and a diarylthiourea with an inert hydrocarbon solvent immiscible with water in the presence of a desulfurizing agent, the heating being carried out with refluxing and return of the solvent, and water being separated from the solvent before its return.

8. The method of producing triphenylguanidine which comprises heating a solution of aniline and thiocarbanilide in an inert hydrocarbon solvent immiscible with water in the presence of a desulfurizing agent, the heating being carried out with refluxing and return of the solvent, and water being separated from the solvent before its return.

9. The method of producing triphenylguanidine which comprises gradually adding lead oxide to a hot boiling solution of aniline and thiocarbanilide in toluene, refluxing the solution during such addition and subsequent thereto until the reaction is completed, and separating water from the refluxed toluene before returning it to the reaction.

10. The method of producing triphenylguanidine which comprises gradually adding about 420 parts by weight of lead oxide to a boiling solution of about 164 parts by weight of aniline and about 400 parts by weight of thiocarbanilide in 1200 parts by weight of toluene, refluxing the solution during such addition and subsequent thereto until the reaction is substantially completed and simultaneously separating the water from the refluxed toluene before returning the toluene to the reaction mixture.

11. In the production of triarylguanidines by the action of desulfurizing agents upon a solution containing arylamine and diarylthiourea in an inert hydrocarbon solvent immiscible with water, and carried out with refluxing and return of solvent to the reaction mixture, the step which comprises the separation of water from the refluxing solvent before returning said solvent to the reaction mixture.

12. In the production of triphenylguanidine by the action of lead oxide upon a solution containing aniline and thiocarbanilide in toluene at the boiling temperature under a reflux condenser and return of the toluene to the reaction mixture, the step which comprises the simultaneous removal of the water from the refluxing toluene prior to its return to the reaction mixture.

In testimony whereof I affix my signature.

LUCAS P. KYRIDES.